US007026784B2

(12) United States Patent
Shimizu et al.

(10) Patent No.: US 7,026,784 B2
(45) Date of Patent: Apr. 11, 2006

(54) INVERTER

(75) Inventors: Hiroshi Shimizu, Mishima (JP);
Junichi Ueno, Tagata-gun (JP);
Kimikazu Kubo, Mishima (JP);
Takashi Asai, Suntou-gun (JP);
Masakazu Komatsu, Mishima (JP);
Yasuyuki Tagano, Numazu (JP);
Toshiyuki Ozaki, Suntou-gun (JP)

(73) Assignee: OMRON Corporation, Kyoto (JP)

( * ) Notice: Subject to any disclaimer, the term of this patent is extended or adjusted under 35 U.S.C. 154(b) by 37 days.

(21) Appl. No.: 10/773,768

(22) Filed: Feb. 6, 2004

(65) Prior Publication Data
US 2004/0195992 A1 Oct. 7, 2004

(30) Foreign Application Priority Data
Feb. 10, 2003 (JP) .............................. 2003-032166
Feb. 3, 2004 (JP) .............................. 2004-027148

(51) Int. Cl.
*H02P 5/34* (2006.01)

(52) U.S. Cl. ...................... 318/801; 318/254; 318/625; 318/675; 363/98

(58) Field of Classification Search ................ 318/801, 318/254, 625, 675, 626, 799; 700/61, 22, 700/3, 7, 83; 702/183, 184, 56
See application file for complete search history.

(56) References Cited

U.S. PATENT DOCUMENTS

| 4,259,621 | A | * | 3/1981 | Jakobsen et al. ............. 318/85 |
| 5,252,902 | A | * | 10/1993 | Uehara et al. ............... 318/599 |
| 5,619,111 | A | * | 4/1997 | Katagiri et al. ............. 318/625 |
| 5,742,143 | A | * | 4/1998 | Katagiri ..................... 318/625 |
| 5,850,338 | A | * | 12/1998 | Fujishima ..................... 700/3 |
| 5,963,444 | A | * | 10/1999 | Shidara et al. ................. 700/7 |
| 5,990,638 | A | * | 11/1999 | Aoyama et al. .............. 318/85 |
| 5,995,910 | A | * | 11/1999 | Discenzo ..................... 702/56 |
| 6,058,036 | A | * | 5/2000 | Endo et al. ................... 363/98 |
| 6,147,469 | A | * | 11/2000 | Uchida et al. ............... 318/675 |
| 6,150,776 | A | * | 11/2000 | Potter et al. ................. 318/139 |
| 6,160,365 | A | * | 12/2000 | Younger et al. .............. 318/16 |
| 6,163,129 | A | * | 12/2000 | Younger et al. ............. 318/799 |
| 6,295,510 | B1 | * | 9/2001 | Discenzo ..................... 702/183 |
| 6,396,030 | B1 | * | 5/2002 | Hashimoto et al. ......... 219/494 |
| 6,430,634 | B1 | * | 8/2002 | Mito ........................... 710/100 |
| 6,434,512 | B1 | * | 8/2002 | Discenzo ..................... 702/184 |

(Continued)

FOREIGN PATENT DOCUMENTS

DE            10207834 A1     9/2002

(Continued)

OTHER PUBLICATIONS

Patent Abstracts of Japan, Publication No. 09-070177, *Inverter Device*, Takahashi Noriko et al., published on Nov. 3, 1997.

*Primary Examiner*—Paul Ip
(74) *Attorney, Agent, or Firm*—Beyer Weaver & Thomas LLP

(57) ABSTRACT

An inverter has a measuring part that measures an operating time such as the time interval from when a command to start a specified operation by an associated system until a signal indicating the completion of the operation is received. A comparing part compares this measured operating time with a threshold value stored in a memory and an abnormal condition is reported to a host system, depending on the result of the comparison.

9 Claims, 9 Drawing Sheets

U.S. PATENT DOCUMENTS

| | | |
|---|---|---|
| 6,445,332 B1 * | 9/2002 | Younger et al. ............ 341/176 |
| 6,445,966 B1 * | 9/2002 | Younger et al. ............. 700/83 |
| 6,479,956 B1 * | 11/2002 | Kawabata et al. .......... 318/254 |
| 6,566,836 B1 * | 5/2003 | Matsubara et al. ......... 318/600 |
| 6,625,498 B1 * | 9/2003 | Kurakake et al. .............. 700/3 |
| 2002/0049505 A1 * | 4/2002 | Heinemann et al. .......... 700/22 |
| 2003/0137270 A1 * | 7/2003 | Sano ......................... 318/625 |
| 2004/0002778 A1 * | 1/2004 | Giamona et al. ............. 700/61 |
| 2004/0207349 A1 * | 10/2004 | Suzuki ....................... 318/254 |

FOREIGN PATENT DOCUMENTS

| | | |
|---|---|---|
| DE | 10147429 A1 | 10/2002 |
| EP | 0788043 A2 | 8/1997 |
| EP | 1017161 A2 | 7/2000 |
| EP | 1253494 A2 | 10/2002 |

\* cited by examiner

| Data L 0 |
|---|
| Data H 0 |
| Data L 1 |
| Data H 1 |
| Data L 2 |
| Data H 2 |
| Data L 3 |
| Data H 3 |
| Data L 4 |
| Data H 4 |
| Data L 5 |
| Data H 5 |
| . |
| . |
| Data L 149 |
| Data H 149 |

| Data State 0 L |
|---|
| Data State 0 H |
| Data State 1 L |
| Data State 1 H |
| Data State 2 L |
| Data State 2 H |
| Data State 3 L |
| Data State 3 H |
| . |
| . |
| Data State 149 L |
| Data State 149 H |

# INVERTER

BACKGROUND OF THE INVENTION

This invention related to an inverter of the kind for driving a motor or the like.

Japanese Patent Publication 9-70177, for example, disclosed an inverter adapted to detect its output current and to stop its operation if an excessively strong current likely to damage the inverter or the motor is detected, interpreting that an abnormal condition has occurred. If the motor and/or any of the components of a system being driven by the motor has become worn and has reached a point where it is required to be replaced, however, such a prior art inverter is not adapted to detect such a situation. Thus, the motor and/or a system component may be damaged, thereby forcing the user to stop the system operation.

SUMMARY OF THE INVENTION

It is therefore an object of this invention to provide an inverted capable of warning the user of a condition of the constituents of the user's system provided with the inverter before they become damaged or begin to malfunction such that the user may be able to take a security measure by undertaking to repair or replace them in a timely fashion.

In view of the object of the invention described above, an inverter of this invention may be characterized as comprising a main circuit part that converts DC power to AC power, a communication part that communicates with an external apparatus through a network and a control circuit part that controls conversion by the main circuit part and transmits condition data representing current conditions related to the inverter to such external apparatus through the communication part. Since an inverter thus structured can communicate with external apparatus such as a programmable controller or a configurator (to be described below) through a network such as a field bus, condition data representing the current conditions related to the inverter can be transmitted to external apparatus. Thus, such a programmable controller can carry out processes in response to the received condition data such as outputting a message that it is time to carry out a maintenance work and the configurator can display the received data graphically to make it easier for the user to monitor them.

According to a preferred embodiment of the invention, the control circuit part includes a measuring part that measures an operating time of a system associated with the inverter, a memory that stores a threshold value for the operating time and a comparing part that compares the measured operating time with the threshold value.

In the above, the "system" may be any system that is provided with the subject inverter. The "operating time" means the time taken by a specified operation such as the movement of an object, the change in temperature, viscosity, the liquid level and pressure. It is up to the structure of the system and/or the user's requirement to determine what should be the operation regarding which operating time is to be considered.

According to this invention, the measured operation time is compared with a preliminarily stored threshold value such that the user can ascertain whether or not the measured operating time has come to exceed the threshold value. If the threshold value is set equal to the length of time which it may be expected to take if the system is operating normally, the user can detect an abnormal condition by comparing the measured operating time with a threshold value thus set, thereby taking a safety measure in a timely manner.

The measuring part may be adapted to measure the operating time based on a detection output from a certain external sensor, that is, the measurement may be either entirely dependent upon the output from such a sensor or according to a combination of the output from the sensor and outputs from some other sensors. All kinds of sensor may be used for the purpose of this invention, depending on the kind of motion or change to be measured, including a proximity sensor, a temperature sensor, a level sensor and a flow rate sensor. In summary, an external sensor may be used for the purpose of the measurement according to this invention.

The inverter of this invention may be for supplying AC power to a motor by using a sensor adapted to detect a specified operation caused by a motion of said motor. In the above, the operation caused by the motor's motion means any action which results from the operation of the motor. Thus, it includes the motion of the motor itself and, in the case of a system for transporting an object on a conveyor driven by a motor, the motion of the conveyor or the object may be considered the "operation." Similarly, in the case of a system for supplying a liquid into a tank by means of a motor-driven pump, it may be the variation in the liquid level inside the tank. In the case of a system for ventilating a room by means of a cooling fan, as a still another example, it may be the change (movement) in the room temperature. In this manner, the user is enabled to determine whether devices and components of a system provided with an inverter of this invention and operated by the motion of a motor are operating normally or not.

In the examples above, the sensor may be one adapted to detect an operation caused by an output from an output device connected to said inverter. Examples of such an output device include electromagnetic valves, relays and electromagnetic touch sensors. In the case of a system for driving a cylinder by air pressure by activating an electromagnetic valve, the motion of the cylinder rod may serve as an example of operation caused by an output from an output device. In this manner, the user of a system provided with an inverter of this invention is enabled to determined whether devices and components operated by outputs from an output device of the system are operating normally or not.

In the inverters of various kinds according to this invention as characterized above, the measuring part may be adapted to measure the operating time based on a change in an operation command from the inverter and a detection output from a sensor. In the case of this example, the time interval from when an operation command to a motor is switched on until when an operation caused by the motion of this motor, for example, may be measured as the operating time.

Alternatively, the measuring part may be adapted to measure the operating time based on a change in a control output to the output device and a detection output from said sensor. In the case of this example, the time interval from when an output command to an output device such as an electromagnetic valve and a relay connected to the inverter is changed until a detection output is obtained from the sensor, for example, may be measured as the operating time.

In all of the examples described above, what was therein referred to as a sensor may be merely one of a plurality of sensors and the measuring part may be adapted to measure the operating time based on detection outputs from all of these plurality of sensors. In such a case, a measurement of operating time may be started based on the detection output from one of the sensors and stopped based on the that from a different one of the sensors.

The control circuit part according to a preferred embodiment of the invention includes a current tracing part that carries out "current tracing" by sampling output current values from the main circuit part and storing the sampled output current values in a time sequence in the memory. With an inverter thus structured, the stored output current values can be read out and displayed so as to allow the user to monitor the changes in the output current values and to take appropriate measures if the changes in the output current value are found to be abnormal.

The control circuit part according to another preferred embodiment of the invention may further include a status data tracing part adapted to store status data items (showing conditions of operation of the inverter when the aforementioned sampled output current values were being sampled) in the memory in correlation with the sampled output current values. With such a control circuit part thus provided, conditions of the operation of the inverter such as whether its speed is changing, it is stopped or it is being run in a DC mode are stored not only as its status data but also in correlation with the sampled output current values, the user can identify the mode the operation when each of the stored current value was sampled and hence monitor the sampled output current values more accurately and significantly.

An inverter according to another embodiment of the invention may be characterized wherein its control circuit part comprises both a current tracing part that carries out current tracing by sampling output current values from the main circuit part and storing the sampled output current values in a time sequence in the memory and a status data tracing part that stores status data (showing operation conditions of the inverter when the sampled output current values are sampled) in the memory in correlation with the sampled output current values, wherein the condition data include the output current values and the status data traced by the current tracing part and by the status data tracing part. With an inverter thus structured, trace data such as sampled output current values and the operation condition (such as whether in operation or in accelerating or decelerating condition) at the time of the sampling can be transmitted to a configurator so as to be thereby displayed graphically.

The aforementioned current tracing may be carried out on the basis of a trigger indicative of a change of condition, examples of which include a change in a command when a command to rotate a motor in the positive or negative direction is switched on or when the output frequency come to agree with a target frequency. Thus, the current tracing can be carried out in correlation with changes of condition such as changes in a command for the operation and hence the user can monitor the output current values over a specified period in correlation with a change in an output condition.

DETAILED DESCRIPTION OF THE INVENTION

The invention is described next by way of examples.

Figure 1:
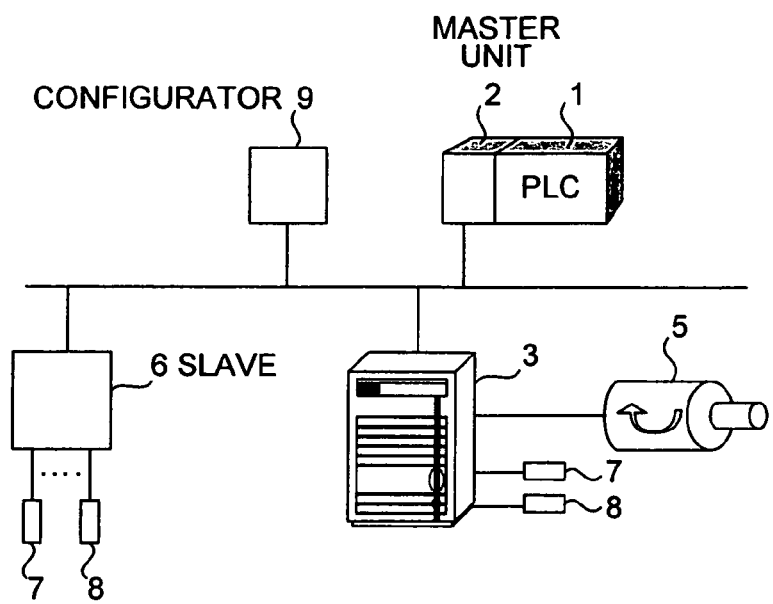
FIG. 1 is a schematic drawing for showing the structure of a system provided with an inverter embodying this invention.

FIG. 1 shows a system comprised of a master unit 2 of a programmable controller (PLC) 1 and an inverter 3 embodying this invention serving as its slave, connected to each other by a field bus (such as Device Net®) serving as a transmission path 4 through which they exchange signals. The inverter 3 is adapted to drive a motor 5 by outputting a driving current thereto according to a motor control signal received from the PLC master unit 2. The motor 5 may be for driving a load such as a belt conveyor for transporting products.

In addition to the inverter 3, other slave units such as sensor terminals and I/O units (shown at 6) may also be connected to the transmission path 4. Such slave units 6 are also connected to I/O devices including input devices 7 such as sensors and switches of various kinds and output devices 8 such as relays and electromagnetic valves such that input signals from the input devices are transmitted through the slave units 6 to the PLC master unit 2 and control signals from the PLC master unit 2 are transmitted through the slave units 6 to the output devices 8.

The inverter 3 according to this embodiment of the invention is provided with I/C terminals for being connected to the aforementioned I/O devices and is connected to the input devices 7 such as sensors and switches or to the output devices 8 such as relays and electromagnetic valves, adapted, like prior art inverters, to transmit input signals from the input devices 7 to the PLC master unit 2 and to output control signals received from the PLC master unit 2 to the output devices 8. A configurator 9 (to be described below) is further connected to the transmission path 4, allowing the user to set and manage the PLC master unit 2, the inverter 3 and the slave devices 6 connected to the transmission path 4 through graphical screen operations.

Figure 2:
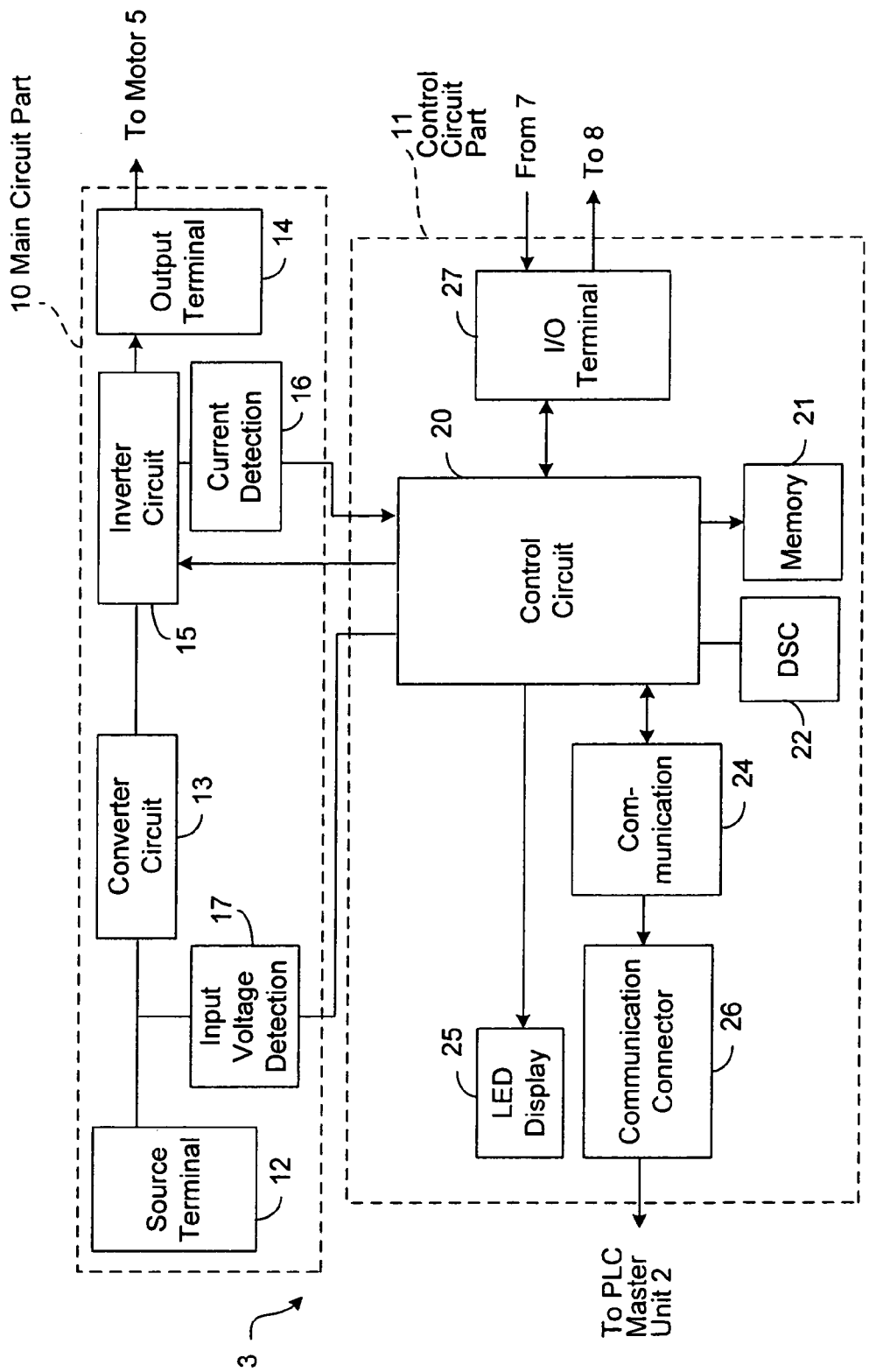
FIG. 2 is a block diagram of the inverter of FIG. 1.

As shown in FIG. 2, the inverter 3 according to this embodiment is comprised of a main circuit part 10 and a control circuit part 11 that controls this main circuit part 10. The main circuit part 10 includes a converter circuit 13 for converting the AC source from a source terminal 12 into a direct current, an inverter circuit 15 for converting this direct current into an alternating current and to supply it through an output terminal 14 to the motor 5, an output current detection circuit 16 for detecting the output current outputted from the inverter circuit 15 and an input voltage detection circuit 17 for detecting the input voltage inputted from the source terminal 12.

The control circuit part 11 includes a control circuit 20 which may be formed with a MPU having various functions to be described below, a non-volatile memory 21 storing parameters for the conditions on the operation control, an oscillator circuit (OSC) 22 for determines an action clock for the control circuit 20, a communication circuit (COMM) 24 for the field bus and a LED display part 25 for displaying data and the like. The control circuit part 11 is capable of communicating with the PLC master unit 12 through the communication circuit 24 and a communication connector 26. It is also adapted to take in the inputs from the input devices 7 such as sensors and switches through an I/O terminal 27 and to provide outputs to the output devices 8 such as relays and electromagnetic valves.

The inverter 3 is structured as will be explained below so as to allow the user to repair or replace constituent components of the system which includes this inverter 3 before they become damaged or malfunction because of their worn-out or deteriorated condition for the safe operation of the system. Explained more in detail, the inverter 3 according to this invention is adapted to monitor the time required for a specified operation of the system and, if the time actually expended for the operation exceeds a given threshold value, to conclude that some correction or maintenance work should be done since too long a time has been spent for the operation and switch the data ("status information") preliminarily defined on a specified memory within the inverter 3 from OFF ("0") to ON ("1"). This status information is transmitted to the PLC master unit 2 serving as a host unit, and the user is thereby enabled to inspect the constituent elements related to this operation.

Consider, for example, a system for transporting products on a conveyor driving by the motor 5 as power is supplied thereto from the inverter 3. For such a system, the required time may be from the moment when the inverter 3 switches on a command for rotating the motor 5 (the "positive rotation command") until a product on the conveyor reaches a specified position and its presence at this position is detected by an external sensor. If this time interval is considered as the time for the operation and is found to exceed a certain preliminarily determined threshold value, it is concluded that the system is not functioning normally and the user is requested to carry out a maintenance inspection on system components such as the motor and the conveyor.

In the case of a system, as another example, adapted to drive a cylinder by controlling an electromagnetic value serving as the output device 8 connected to the inverter 3, the time interval from the moment when the inverter 3 switched on an output command to the electromagnetic valve until the cylinder rod reaches a specified position and is detected by an external sensor may be monitored as the time for the operation. If this time interval is found to exceed a predetermined threshold value, it may be considered that the system is not functioning normally and the user may be requested to carry out a maintenance inspection on the system components such as the cylinder, As illustrated above by way of two examples, various time intervals may be treated as the time of operation according to this invention, depending not only on the structure of the user's system but also on the user's needs. However, the following two kinds of situations may be considered.

One of the situations is where a plurality of external sensors are connected and the time of operation may be defined as the difference between the output times of these sensors. For example, the time interval from the moment when a first sensor is switched on until a second sensor is switched on may be defined as the time of operation. The other kind is where an external sensor is provided and the time interval from the moment when therein a change in a certain inner status data item indicative of an operation command or the output condition of an output device until the output from this external sensor makes a change. For example, the time interval from the moment when the inner status data item changes to indicate that a command to rotate the motor in a positive or negative direction (the "positive rotation command" or the "negative rotation command") has been switched on until the external sensor is switched on may be measured and considered as the time of operation. As another example, the time of operation may be from the moment when the inner status data item indicates a change that an output command to an output device such as a relay or an electromagnetic valve has been switched on until the output from the external sensor makes a change.

Since inverters are conventionally adapted to be connected to input devices such as sensors and output devices such as relays, prior art inverters may be used for the purpose of this invention to measure such times of operation. Measurements of times of operation are carried out by the control circuit 20.

The control circuit 20 of the inverter 3 in provided with the functions of a measuring part for measuring a time of operation as explained above, a memory part for storing preliminarily set threshold values and a comparing part for comparing a measured time of operation and a stored threshold value and serves to change a security status data item from OFF ("0") to ON ("1") if the measured time of operation exceeds the threshold value. The threshold value is preliminarily stored at a specified location of the non-volatile memory 21 by the user's operation on the configurator 9. The user also operates on the configurator 9 to determine which of the two types of time of operation should be measured and what should be treated as the inner status data item. The external sensors for the measurements of times of operation as well as the output device 8 are connected appropriately by the user to the I/O terminal 27 on the basis of operation manuals or the like.

The security status data are transmitted to the PLC master unit 2 through the transmission path 4. When a status data item is switched on, the PLC 1 carries out a suitable operation for informing the user thereof.

Since the security status data are updated and compared with a threshold value whenever a measurement of a time of operation is measured, a security data item which is switched ON once because a measured operation has exceeded a threshold value may return to the OFF condition at the next time of updating such that the user may miss the intended warning. In order to prevent such situations, the present embodiment of the invention is adapted to set a so-called status hold mode wherein the security status data item is held switched on once the operation time exceeds the threshold value and the status data item is switched on even if the operation time measured on a subsequent occasion is under the threshold value. A so-called peak value hold mode may also be provided wherein the longest of the operation times measured previously is stored as the peak value.

Figure 3:
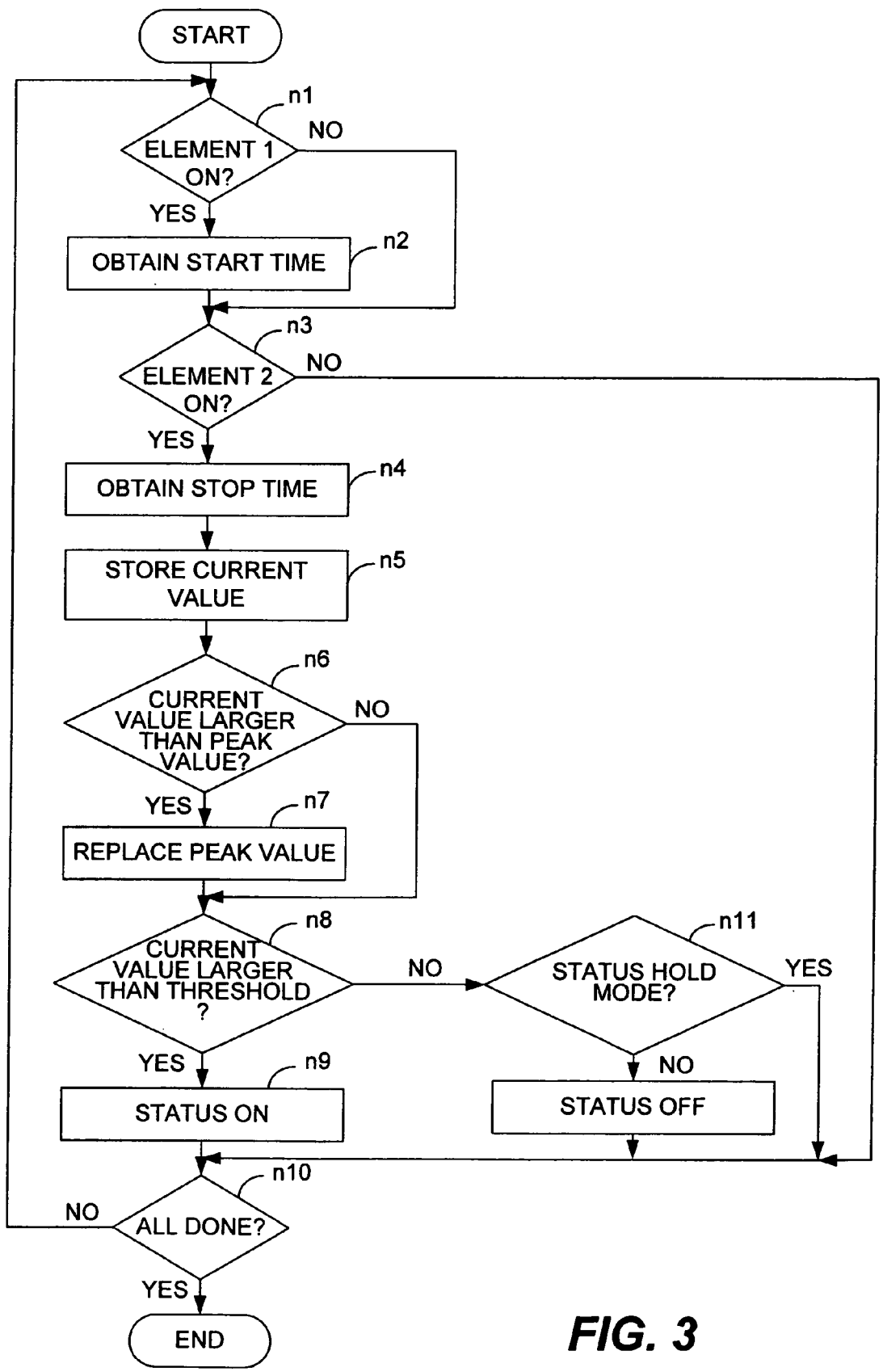
FIG. 3 is a flowchart of the operations of the system of FIG. 1.

FIG. 3 is referenced next to explain the basic operations for the measurement of a time of operation. In this explanation, the element that causes the measurement of the time of operation to be started is referred to as Element 1 and the element causing the end of the measurement is referred to as Element 2. Examples of Element 1 include inner status data such as operation commands and examples of Element 2 include external sensors.

If it is initially determined that Element 1 has been switched on (YES in Step n1), the starting time of measurement of the operation time is obtained (Step n2). When Element 2 is switched on (YES in Step n3), the stopping time of the measurement is obtained (Step n4) and the time interval between the start and the end of the operation time is calculated and stored as the "current value" of the operation time (Step n5).

If the current value thus obtained is found to be greater than a peak value which is currently being stored (YES in Step n6), the peak value is replaced by the current value (Step n7) and if the current value is greater than a threshold value (YES in Step n8), a security status data item ("STATUS") is switched on (Step n9). If all measurements have then been completed (YES in Step n10), the process is ended. If not (NO in Step n10), the process returns to Step n1.

If the current value is found not to be greater than the threshold value (NO in Step n8), it is checked whether the aforementioned status hold mode is set (Step n11). The process proceeds to Step n10 if the status hold mode is set (YES in Step n11). If the status hold mode is not set (NO in Step n11), that is, if the so-called update mode is set, the security status data item is switched off (Step n12) and then the process proceeds to Step n10.

Figure 4:
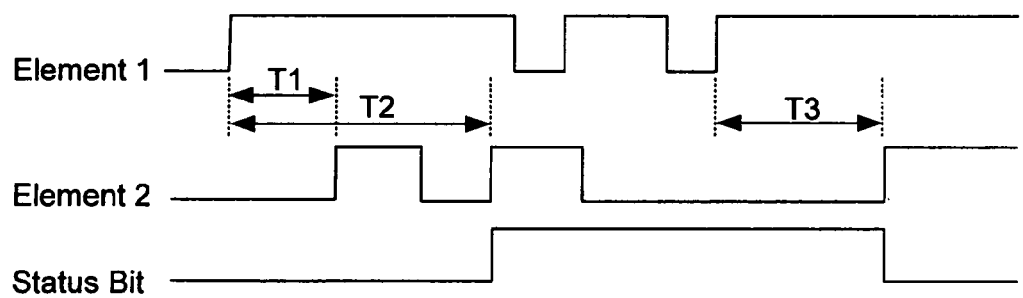
FIG. 4 is a time chart of the operations of the system of FIG. 1.
Figure 5:
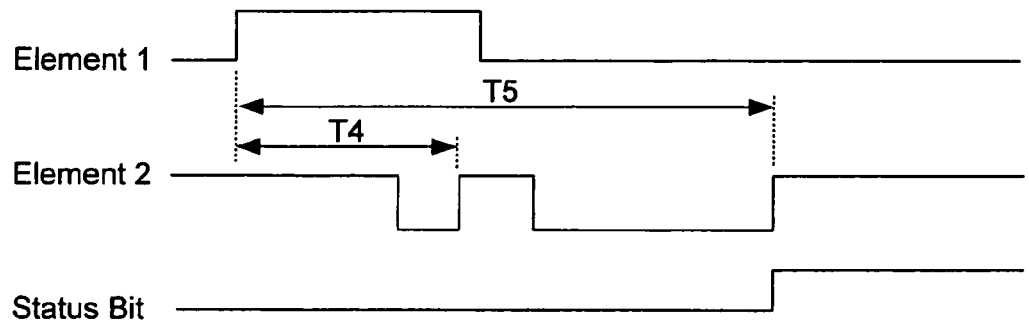
FIG. 5 is a time chart of another operation of the system of FIG. 1.

FIGS. 4 and 5 are time charts showing examples of operations including those that are different from the basic operations explained above with reference to FIG. 3. FIGS. 4 and 5 each show status changes in Elements 1 and 2 and the "status bit" for the security status data item ("status information").

In the example shown by FIG. 4, the operation time length T1 from when Element 1 is switched on until Element 2 is switched on is not greater than the threshold value and the status information is switched off. Since the time length T2 until when Element 2 is switched on again is greater than the threshold value, the status information is switched on. During the period from when Element 1 is switched on for the second time until it is switched on for the third time, the operation time is not measured because Element 2 is not switched on. The time interval T3 from when Element 1 is switched on for the third time until Element 2 is switched on is not greater than the threshold value and the status information is switched off.

In FIG. 5, the time interval T4 from when Element 1 is switched on until Element 2 is switched on is measured as the operation time inclusive of the period when Element 2 was earlier switched on. This operation time T4 is not greater than the threshold value and the status information remains switched off. Since the operation time period of T5 from when Element 1 is switched on until when Element 2 is switched on for the second time is greater than the threshold value, the status information is switched on.

The invention is explained next by way of several practical examples.

Figure 6:
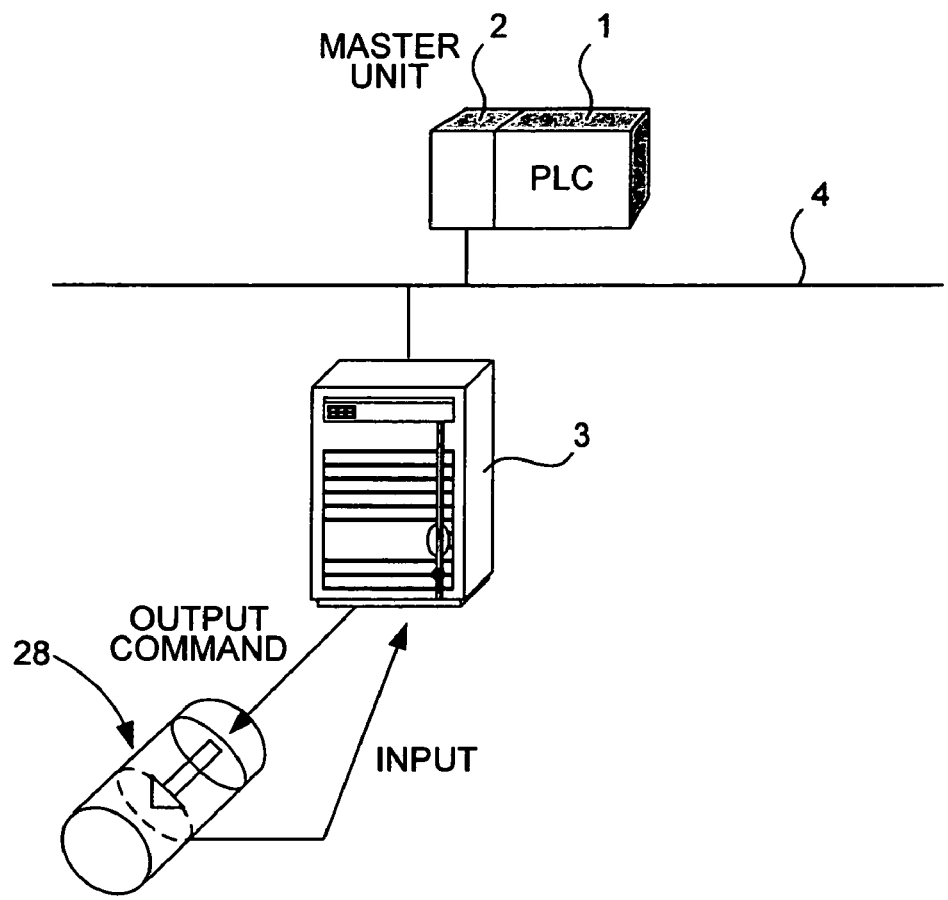
FIG. 6 is a schematic drawing of an example of a system of the type shown in FIG. 1.
Figure 7:
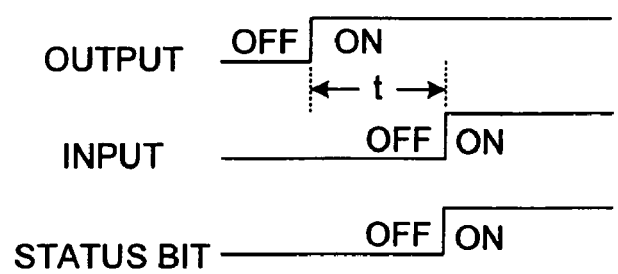
FIG. 7 is a time chart for the system of FIG. 6.

FIG. 6 shows the structure of a system of the type shown in FIG. 1 for monitoring the condition of a cylinder 28 to repair or replace it. Components of this system that corresponds to those shown in FIG. 1 are indicated by the same numerals and will not be described repetitiously. The inverter 3 shown in FIG. 6 is adapted to measure the time interval t shown in FIG. 7 from when an output command to an electromagnetic valve serving as the output device for driving the cylinder 28 is switched on until a sensor detects that the cylinder rod reached a specified position. If this measured operating time t has become greater than a preliminarily specified threshold value, the status bit for the security status data item is switched on as shown in FIG. 7 to urge the user to take an appropriate measure.

Figure 8:
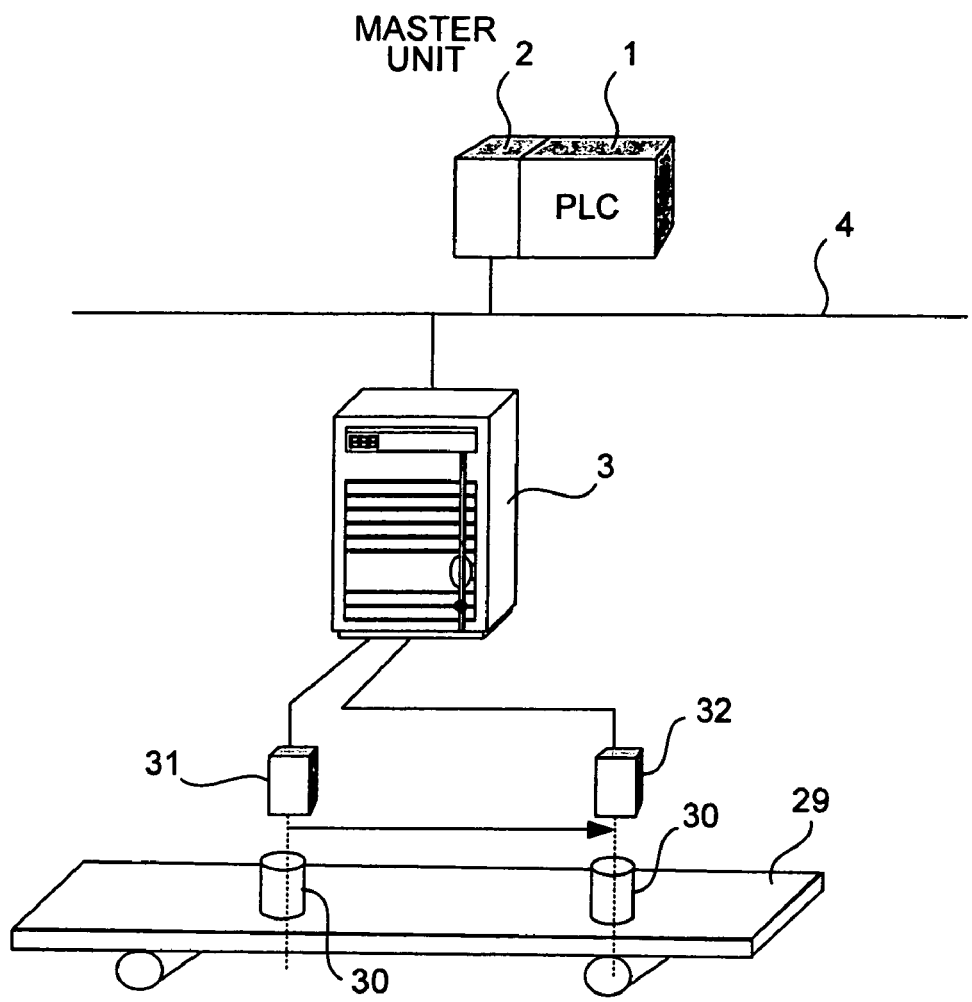
FIGS. 8 and 10 are schematic drawings of other examples of a system of the type shown in FIG. 1.
Figure 9:
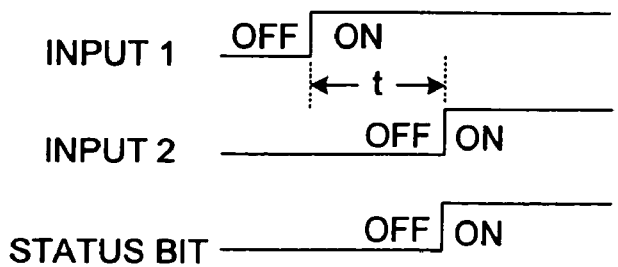
FIG. 9 is a time chart for the system of FIG. 8.

FIG. 8 shows an example wherein an inverter 3 according to this invention is connected to two sensors (the first sensor 31 and the second sensor 32) for detecting an object 30 at their two respective positions (the upstream position and the downstream position) as it is being transported on a conveyor 29 and is adapted to measure as the operating time the time interval from when the object 30 is detected by the first sensor 31 until it is detected by the second sensor 32. With reference to FIG. 9, the time interval t from the moment when the input from the first sensor 31 is switched on until when the input from the second sensor 32 is switched on is measured and is compared with a preliminarily specified threshold value. If the operation time t thus measured is greater than a preliminarily specified threshold value, the status bit for the security status data item is switched on as shown in FIG. 9 to urge the user to take steps of maintenance and inspection. Thus, the user can be informed of the type of abnormality such as degradation or damage of the conveyer, and shortage of oil for the motor and steps such as replacement and repair can be properly taken.

Figure 10:
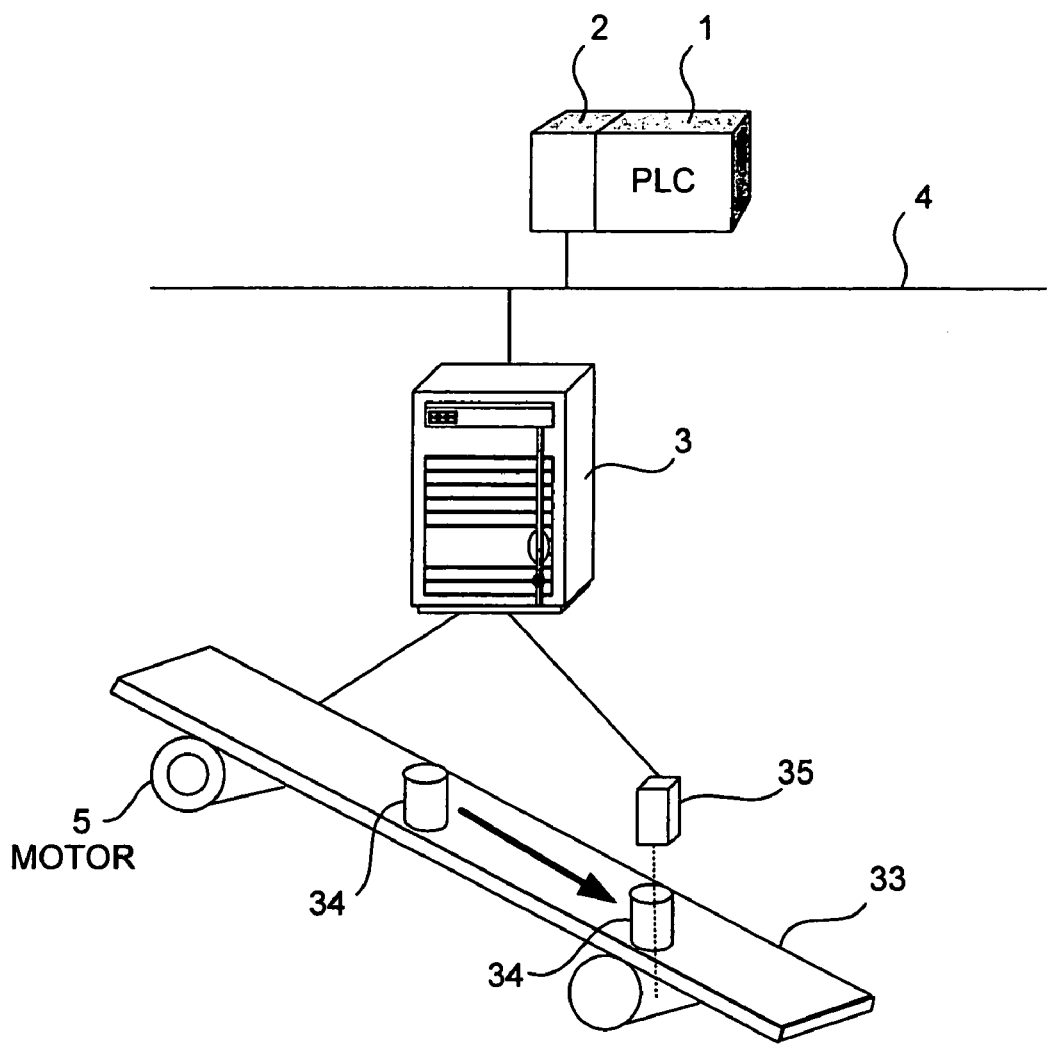
Figure 11:
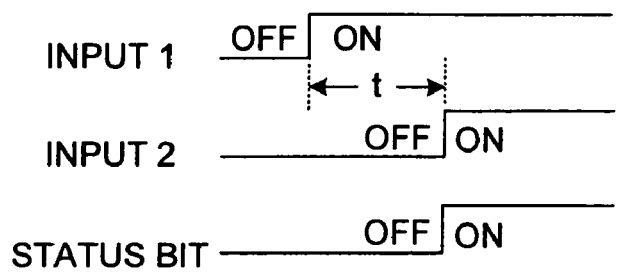
FIG. 11 is a time chart for the system of FIG. 10.

FIG. 10 shows another example wherein an inverter 3 according to this invention is connected to a sensor 35 for detecting an object 34 as it is being transported on a conveyor 33 being by a motor 5 controlled by the inverter 3 itself and is adapted to measure as the operating time the time interval from when a command to the motor 5 to rotate is switched on until when the object 34 is detected by the sensor 35. With reference to FIG. 11, the time interval t from when a command from the PLC master unit 2 is switched on until an input from the sensor 35 is switched on is measured and if this operation time t is greater than a preliminarily specified threshold value, the status bit for the security status data item is switched on as shown in FIG. 11 to alert the user.

Besides this function of monitoring the operation time, the inverter 3 in this example has the additional function of "tracing" the output current, that is, the function of sampling the output current values detected by the aforementioned output current detection circuit 16 shown in FIG. 2 at a specified sampling frequency and sequentially storing the sampled values in the buffer of the control circuit 20. Such traced output current values are transmitted through the transmission path 4 to the configurator 9 (shown in FIG. 1), whenever necessary. These output current values may be graphically displayed by the configurator 9 for monitoring.

For sequentially sampling the output current from the inverter circuit 15 at sampling intervals set by the user within the range of 10 ms–100 sec, for example, and storing in the buffer, the following five current tracing modes may be provided such that the user can select one of these modes by operating on the configurator 9. Information showing the current trace mode selected by an operation on the configurator 9 by the user may be stored at a specified area of the non-volatile memory 21. The configurator 9 may also be so structured as to allow the user to operate thereon to send a command to the inverter 3 for stopping the tracing of the output current.

(1) Normal mode, in which the tracing of current values is continued once started until a command to stop the tracing is received from the configurator 9. New data are written over old data when the buffer capacity is exhausted.

(2) Buffer full stop mode, in which the tracing of current values is automatically stopped when the buffer capacity is exhausted after the tracing is started.

(3) Start trigger mode, in which if a there is a trigger after the tracing is started, the tracing of current values is carried out thereafter corresponding to the full capacity of the buffer and then stopped.

(4) Middle trigger mode, in which if there is a trigger after the tracing is started, current values corresponding to the full capacity of the buffer traced before and after the trigger are traced.

(5) Stop trigger mode, in which the tracing is stopped if there is a trigger after the tracing is started.

In the three modes (3), (4) and (5), tracing is stopped by using a change in the status information which is a collection of data showing the internal condition of the inverter 3. Examples of the status information include the positive rotation command flag which indicates whether or not the positive rotation command has been switched on, the negative rotation command flag which indicates whether or not the negative rotation command has been switched on, the frequency matching flag which indicates whether or not the output frequency matches the target frequency and the abnormality flag which indicates that an abnormality has occurred within the inverter. A change in these flags such from OFF (0) to ON (1) may be used as the trigger. The control circuit 20 is not only adapted to trace the current values but also provided with the function ("status data tracing function") of storing status information in the buffer indicative of inner conditions individually corresponding to the traced current values each in correspondence with the associated current value.

The status information to be stored in the buffer corresponding to the current value is the information stored at a specified memory of the inverter 3. Four kinds "0", "1", "2" and "3" formed as combinations of three conventional types ("in-operation flag" indicating whether or not current is running through the motor 5, "zero-speed flag" indicating whether or not the motor 5 is in the condition of not rotating, and "frequency matching flag" indicating whether or not the output frequency matches the target frequency) may be used, for example.

Figures 12, 13:
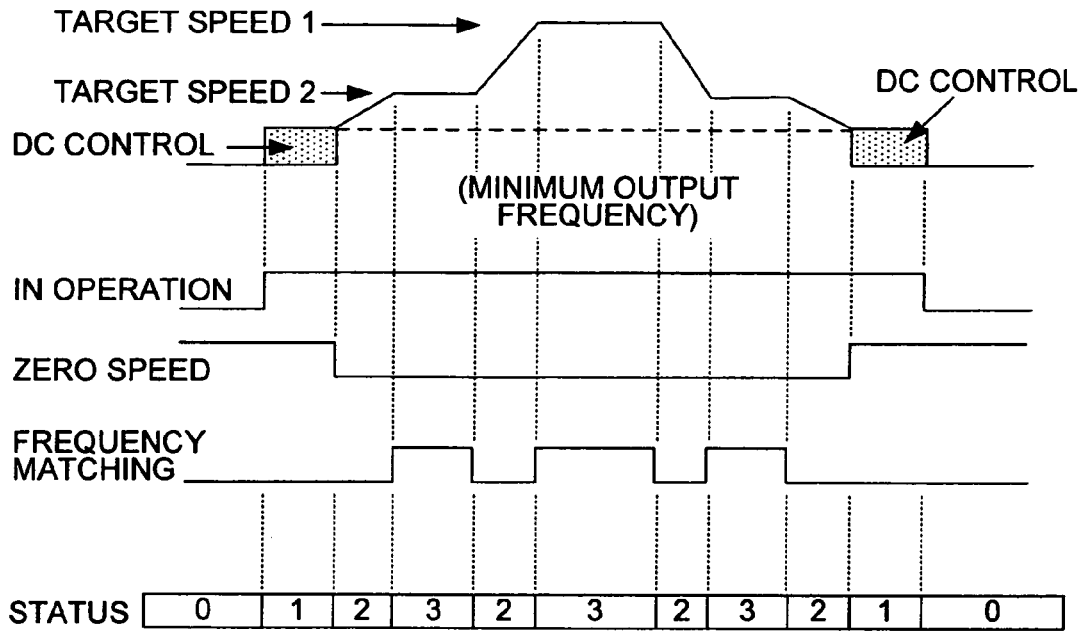
FIG. 12 is a time chart for showing the relationship between output frequency and status data.
FIG. 13 shows an example of buffer structure for current tracing.

Table 1 shows the relationship between these four kinds of status data and the three conventional kinds of status data and FIG. 12 shows an example of time chart inclusive of the output frequency.

TABLE 1

| In Operation | Zero Speed | Frequency Matching | Status | Meaning of Status |
|---|---|---|---|---|
| OFF | Ignore | Ignore | 0 | Action stopped/No data |
| ON | ON | Ignore | 1 | DC control |
| ON | OFF | OFF | 2 | Changing speed (No frequency matching) |
| Ignore | Ignore | ON | 3 | Frequency matching |

Status data "0" means that the in-operation flag is OFF, that is, when there is no action and there are no data as shown in FIG. 12. Status data "1" means that the in-operation flag is ON, that is, it is in DC control mode. The minimum output frequency has not been reached and the motor is not rotating although power is being consumed. Status data "2" means that the in-operation flag is ON, the zero-speed flag is OFF and the frequency matching flag is OFF and indicates that the motor is accelerating or decelerating. Status data "3" means that the frequency matching flag is ON and indicates that the motor is rotating at a constant speed equal to target speed 1 or 2).

In summary, not only the output current values but also these additional status data are sequentially stored in the buffer in correlation with the output current values. The number of status data and the choices as status data are not intended to limit the scope of the invention.

Figures 14, 15:
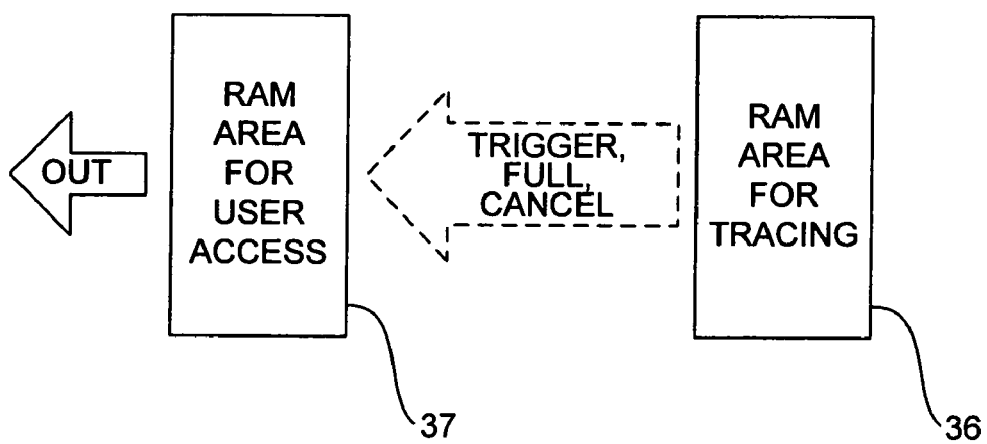
FIG. 14 shows an example of buffer structure for status data tracing.
FIG. 15 is a drawing for explaining the structure of the buffer.

Next, the structure of traced data is described. FIG. 13 shows an example of current value data of UNIT type 2-byte (H and L) structure stored in 150 (0–149) buffers. FIG. 14 shows an example of status data also of UNIT type 2-byte (H and L) structure using only lower bits 0–7 stored in 150 (0–149) buffers, upper bits 8–15 not being used. Of the lower bits, bits 0 and 1 are used to indicate the status ("00", "10", "10" and "11" respectively for status "0", "1", "2" and "3" as defined above), bits 2–5 are not used, bit 6 shows whether it is the last (newest) traced point (in the order of storing) and bit 7 shows whether it is a trigger point or not. With the status data thus structured, the user can easily understand the status of operation, whether it is the last (newest) traced data (in the order of storing), and also whether it is traced data stored at the time of occurrence of a trigger.

The buffer structure is explained next by way of an example shown in FIG. 15. A first RAM area 36 is a trace buffer for storing trace data such as an electric current value during a tracing period. A second RAM area 37 is a buffer for user's access. The trace data stored in the first RAM area 36 are transferred into the second RAM area 37 when the tracing is completed. This is such that trace data can be read out of the second RAM area 37 even while a tracing process is being carried out.

Figure 16:
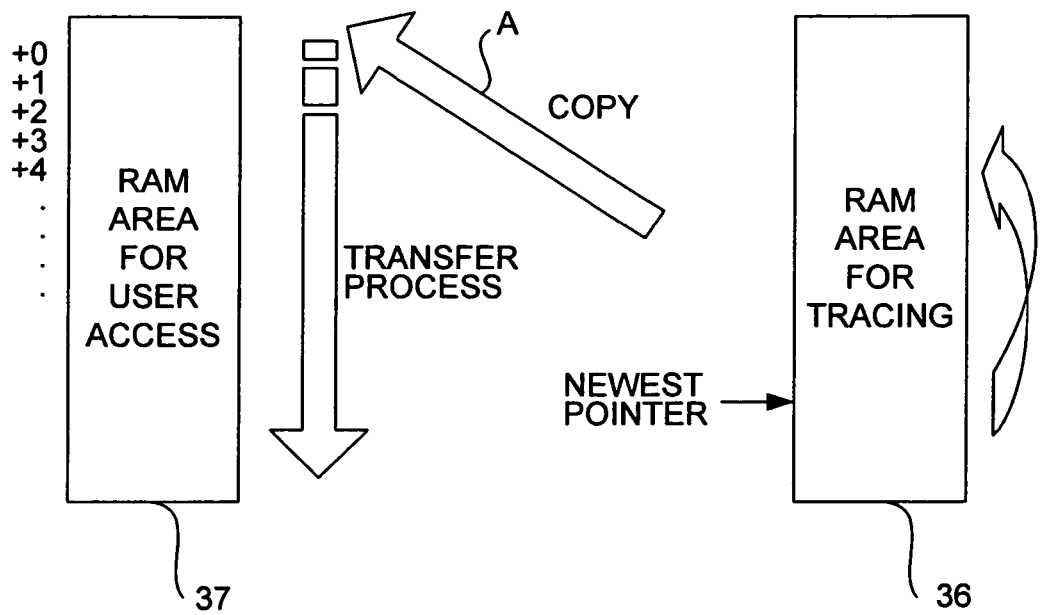
FIGS. 16 and 17 are drawings for explaining the transfer of traced data.

Transfer of trace data from the first RAM area 36 for tracing to the second RAM area 37 for user access is carried out as follows. In the normal mode (1) or trigger mode ((3), (4) or (5) of the above), trace data are sequentially written into the first RAM area 36 and when it becomes full, new data are written over the old data sequentially from the uppermost address as shown in FIG. 16. The control circuit part 11 completes the tracing when a stop-tracing command is received from the configurator 9 or a trigger for ending the tracing in the mode (3), (4) or (5) takes place. When a transfer is made to the second RAM area 37, the trace data at the newest pointer becomes the starting position and the copying process proceeds sequentially as shown by Arrow A from the uppermost position of the second RAM area 37. In other words, the newest trace data item is always stored at the uppermost position of the second RAM area 37.

Figure 17:
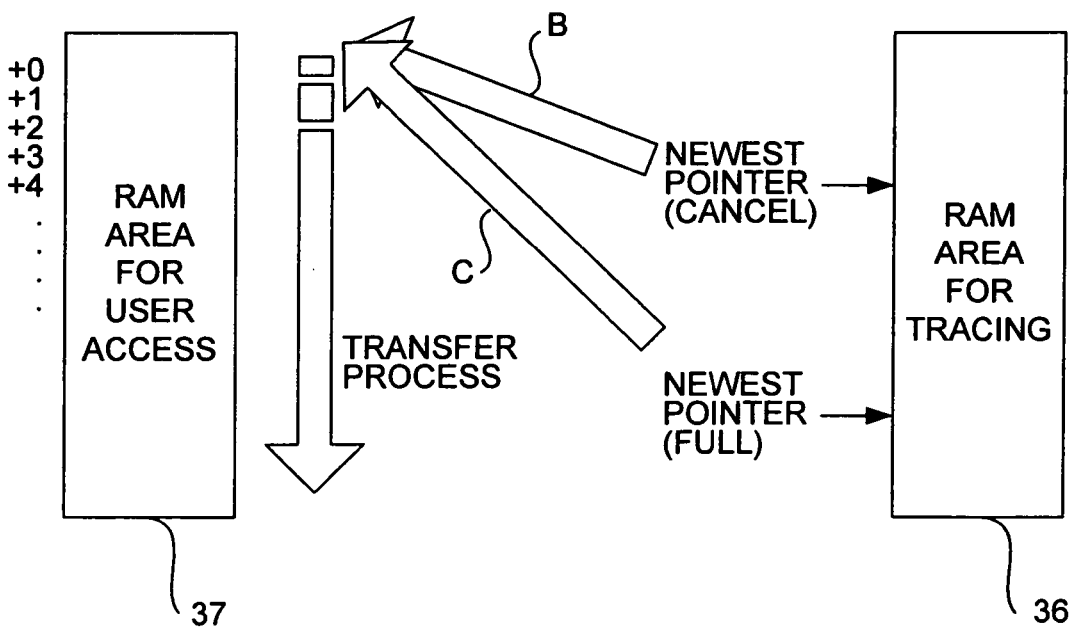

In the buffer full mode, the control circuit part 11 writes trace data sequentially into the first RAM area 36 until a stop-tracing command is received from the configurator 9. When trace data written in the first RAM area 36 are transferred to the second RAM area 37, the copying process is carried out sequentially from the trace data at the newest pointer (Arrow B in the case of a stop-tracing command received from the configurator 9 and Arrow C in the case of a full capacity) to the top of the second RAM area 37, as shown in FIG. 17. Unless a stop-tracing command is received from the configurator 9, the newest pointer position is always at the bottom of the first RAM area when it becomes full.

The example described above is not intended to limit the scope of the invention. Many modifications and variations are possible within the scope of the invention. For example, a plurality of threshold values may be used to compare with measured operation times such that judgments may be made in stages. An abnormal condition may be defined when a measured operating time is found to be less than the threshold value instead of over the threshold value. In summary, the present invention makes it possible to detect an abnormal operation condition by measuring operating times and comparing them with a threshold value and to take an appropriate measure accordingly. If output current values are traced according to another embodiment of the invention, safety measures may be taken by monitoring the output current values on the basis of traced data.

What is claimed is:

1. An inverter comprising:
   a main circuit part that converts DC power to AC power;
   a communication part that communicates with an external apparatus through a network; and
   a control circuit part that controls conversion by said main circuit part and transmits condition data representing current conditions related to said inverter to said external apparatus through said communication part;
   wherein said control circuit part includes:
   a measuring part that measures an operating time of a system associated with said inverter;
   a memory that stores a threshold value related to said operating time; and
   a comparing part that compares a measured operating time measured by said measuring part with said threshold value, said condition data including a result of comparison by said comparing part.

2. The inverter of claim 1 wherein said measuring part measures said operating time based on a detection output from an external sensor.

3. The inverter of claim 2 serving to supply AC power to a motor,
   wherein said sensor detects an operation caused by a motion of said motor.

4. The inverter of claim 2 wherein said sensor detects an operation caused by an output from an output device connected to said inverter.

5. The inverter of claim 4 wherein said measuring part measures said operating time based on a change in a control output to said output device and said detection output from said sensor.

6. The inverter of claim 2 wherein said measuring part measures said operating time based on a change in an operation command from said inverter and said detection output from said sensor.

7. The inverter of claim 2 wherein said sensor is one of a plurality of sensors and said measuring part measures said operating time based on detection outputs from said plurality of sensors.

8. The inverter of claim 1 further comprising:
   a current tracing part that carries out current tracing by sampling output current values from said main circuit part and storing said sampled output current values in a time sequence in said memory; and
   a status data tracing part that stores status data in said memory in correlation with said sampled output current values, said status data showing operation conditions of said inverter when said sampled output current values are sampled;
   wherein said condition data include said output current values and said status data traced by said current tracing part and by said status data tracing part; and
   wherein said current tracing part carries out said current tracing based on a trigger that indicates a condition change.

9. The inverter of claim 8 wherein said current tracing part carries out said current tracing based on a trigger that indicates a condition change.

* * * * *